Sept. 22, 1942.    N. F. SMITH, JR    2,296,745
FILTER CIRCUITS FOR RECTIFIED ALTERNATING CURRENT
Filed June 5, 1940
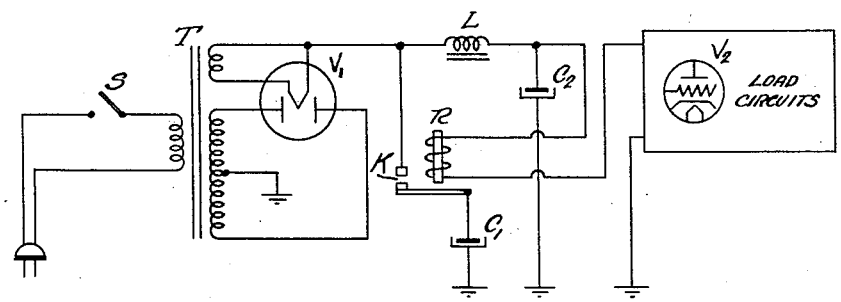
Inventor:-
Newland F. Smith, Jr.
by his Attorneys
Howson & Howson Patented Sept. 22, 1942

2,296,745

UNITED STATES PATENT OFFICE 2,296,745

FILTER CIRCUIT FOR RECTIFIED ALTERNATING CURRENT

Newland F. Smith, Jr., Wyndmoor, Pa., assignor to Philco Radio and Television Corporation, Philadelphia, Pa., a corporation of Delaware Application June 5, 1940, Serial No. 339,019
In Great Britain June 13, 1939

3 Claims. (Cl. 175—363)

This invention relates to rectifier-filter circuits employed in power supply systems and the like, and more particularly to power supply systems utilized in supplying high anode voltages to vacuum tube or similar loads.

Where voltages not exceeding about 400 volts are encountered, it is most economical to employ electrolytic capacitors in the filtering of the rectified alternating current. However when voltages substantially in excess of this value appear across the filter circuits, the use of such electrolytic capacitors is impractical, necessitating the use of the more expensive and bulkier paper capacitors. This has presented a substantial problem in those instances where the full-load voltage output of the system is low enough to permit the use of standard electrolytic capacitors, but where the no-load voltage is above the safe limit for these capacitors. Such a condition has been found to exist in large radio or television receivers and the like, wherein the no-load voltage may be of the order of 500 volts, but may normally decrease within a minute to 350 volts or less. The time element is occasioned, of course, by the delay in heating of the various vacuum tube cathodes, the vacuum tubes forming the larger part of the rectifier load.

The present invention provides a novel and simple solution to the problem. According to the invention there is provided in a rectifier-filter power supply circuit, a source of rectified alternating current, means for filtering said current comprising at least an inductor, an input capacitor, and an output capacitor, a load circuit supplied with current from said filtering means, and automatically operative means for connecting said input capacitor across said rectified current source only after a predetermined current is being supplied to said load circuit.

The invention may best be understood by reference to the accompanying drawing, the single figure of which is a schematic diagram of a power supply system embodying the invention.

Referring to the drawing, the system illustrated comprises a step-up transformer T, a full-wave rectifier $V_1$, and a filter system which includes a reactor or choke coil L with input and output capacitors $C_1$ and $C_2$ respectively. The rectangle at the right represents a generalized load which may include vacuum tubes of the indirect heater type as indicated by $V_2$. As is well understood in the art, the plate current drawn by such tubes will not rise to a normal value until normal cathode temperature has been reached; and until this temperature is attained, the current supplied to the load will be low, being substantially zero for a large part of the initial heating time. During this time, the voltage on the capacitors $C_1$ and $C_2$ will be substantially equal to the peak value of the voltage applied to the rectifier, since at no-load the condensers will be enabled to charge up to this level and to maintain this charge between peaks of the impressed voltage wave. Accordingly if a transformer-rectifier-filter combination be provided which is capable of supplying say 330 volts at full load, the voltage impressed on the capacitors may reach 450 or 500 volts under no-load conditions, which is not a safe voltage to apply to standard electrolytic capacitors.

It is therefore an important feature of this invention to provide automatic means for connecting the input capacitor $C_1$ to the rectified current source only after the load current reaches a predetermined value. Under no-load conditions, the filter operates as a choke-input filter which comprises only the choke L and the output capacitor $C_2$. Since the no-load voltage output of such a filter is very considerably less than that of a capacitor-input filter, the safe operating voltage of the capacitor $C_2$ will not be exceeded, while the capacitor $C_1$ will be out of circuit entirely. Accordingly there may be provided a relay device R having a winding disposed in the load current path, and whose contacts K are closed only after the load current reaches a predetermined value. Obviously the relay may be designed to operate at any desired load current level. During the normal heating period of the tubes comprising the load, the load current will rise to a value dependent upon the extent of heating and upon the voltage appearing across the load. Since the load is initially operating from a filter having a choke input the voltage applied to the load will be less than normal, as hereinbefore explained, and hence the load current will likewise be less than normal. Therefore the relay should be designed to operate at a load current value less than the full load value obtaining when normal voltage is applied to the load. When the predetermined load current is established the contacts K close, connecting the input capacitor $C_1$ in its normal position and thereby establishing the voltage output of the filter at the desired value.

Obviously the invention is not restricted to the use of electrolytic capacitors, since the practice of the invention will in general permit the use of condensers having a lower voltage rating than would otherwise be possible. The invention is of particular interest however in the case illustrated, since its practice will permit the use of standard electrolytic capacitors where they might otherwise be impractical. The invention can, of course, be used with any type of rectifier circuit, whether of the single wave or full wave type, and the filter may comprise more than the single section illustrated. Thus while the invention has been described with particular reference to the accompanying drawing, it will be understood that the invention is capable of various forms of physical expression and is therefore not to be limited to the specific disclosure.

I claim:

1. A high voltage power supply circuit comprising a source of rectified alternating current, means for filtering said current comprising at least a series inductor, a shunt input condenser, and a shunt output condenser, a load circuit connected to the output of said filter, said load circuit being of the type that draws an initially small current and a much larger current after a period of operation, said source of rectified alternating current producing a substantially lower rectified voltage under said larger current load and a higher rectified voltage under said initially small current load, at least one of said condensers being incapable of withstanding said higher rectified voltage, and means to protect said condenser from said higher rectified voltage comprising a relay having an actuating winding and a pair of contacts adapted to close when said larger current flows in said actuating winding, said actuating winding being in series with said load and said contacts being in series with the condenser which it is desired to protect.

2. A high voltage power supply circuit comprising a source of rectified alternating current, means for filtering said current comprising at least a series inductor, and a shunt input condenser, a load circuit connected to the output of said filter, said load circuit being of the type that draws an initially small current and a much larger current after a period of operation, said source of rectified alternating current producing a substantially lower rectified voltage under said larger current load and a higher rectified voltage under said initially small current load, said input condenser being incapable of withstanding said higher rectified voltage, and means for automatically connecting said input condenser only when said larger current flows in said load, whereby to protect said input condenser from said higher rectified voltage.

3. A high voltage power supply circuit comprising a source of rectified alternating current, means for filtering said current comprising at least a series impedance and a shunt input condenser, a load circuit connected to the output of said filter, said source of rectified alternating current producing a substantially lower rectified voltage under a larger current load and a higher rectified voltage under a small current load, the higher rectified voltage having a deleterious effect on said input condenser, and means for automatically connecting said input condenser only when said larger current flows in said load, whereby to protect said input condenser from said higher rectified voltage.

NEWLAND F. SMITH, Jr.